2 Sheets—Sheet 1.

W. ZAEHRINGER.
Fare-Box.

No. 210,230. Patented Nov. 26, 1878.

Witnesses.
Alfred W. L. Mason
Hugh Pierson

Inventor.
Wm Zaehringer
BY H. N. Jenkins
Attorney.

2 Sheets—Sheet 2.

W. ZAEHRINGER.
Fare-Box.

No. 210,230. Patented Nov. 26, 1878.

WITNESSES.
Alfred W. L. Mason
Hugh Pierson

INVENTOR.
Wm Zaehringer
H. N. Jenkins
ATTORNEY.

UNITED STATES PATENT OFFICE.

WILLIAM ZAEHRINGER, OF NEW ORLEANS, LOUISIANA.

IMPROVEMENT IN FARE-BOXES.

Specification forming part of Letters Patent No. 210,230, dated November 26, 1878; application filed September 23, 1878.

*To all whom it may concern:*

Be it known that I, WILLIAM ZAEHRINGER, a resident of the city of New Orleans, parish of Orleans, and State of Louisiana, have invented a certain new and useful Improvement in Fare-Boxes for Cars and other Passenger Conveyances; and I do hereby declare the following to be a full, clear, and correct description of the same, reference being had to the annexed drawing, making a part of this specification.

This invention is provided with a temporary receiver having a series of compartments, in which the fares are successively collected and separately held until by the revolving of the receiver they are brought to a certain point, where they automatically discharge their contents into a lower receptacle, the fares in the meantime being visible to the passengers as well as the driver. Hence my invention affords a means for observing and rectifying any mistakes that may be made by dropping incorrect or counterfeit fares, as well as by exposing unscrupulous individuals, who by collusion with the driver merely go through the form of depositing their fare. But my invention will be much better understood by referring to the accompanying drawings, whereon—

Figure 1:
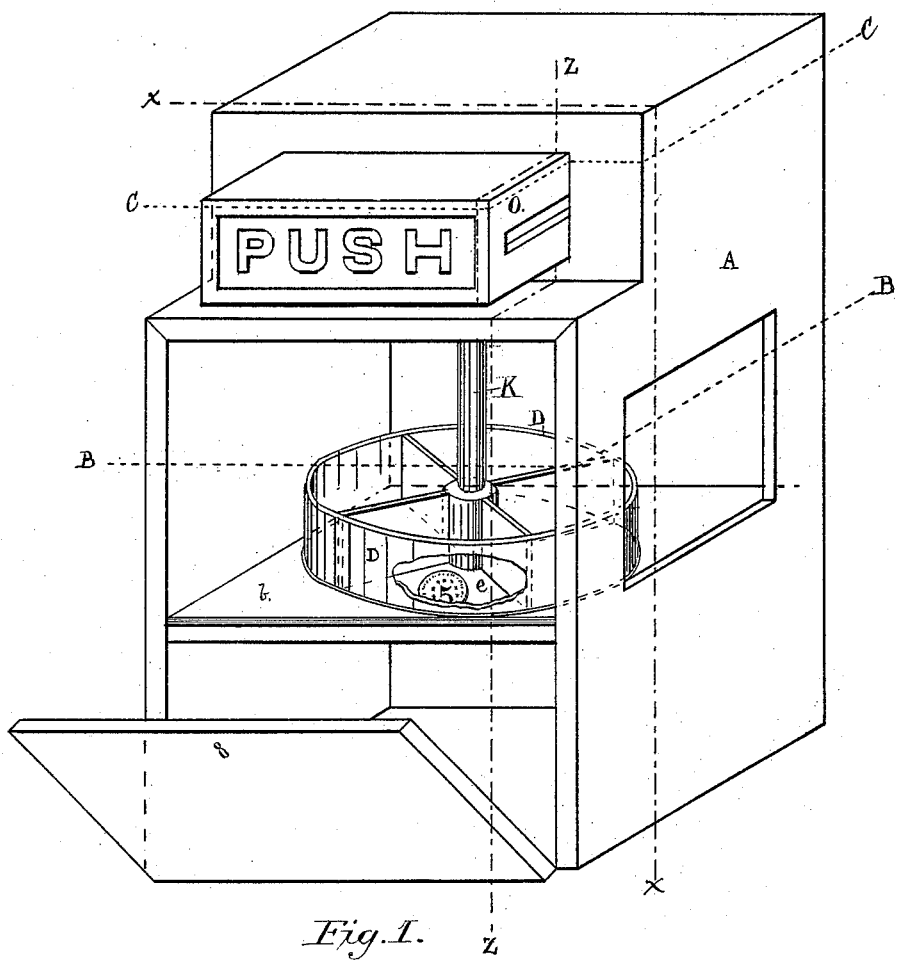
Figure 2:
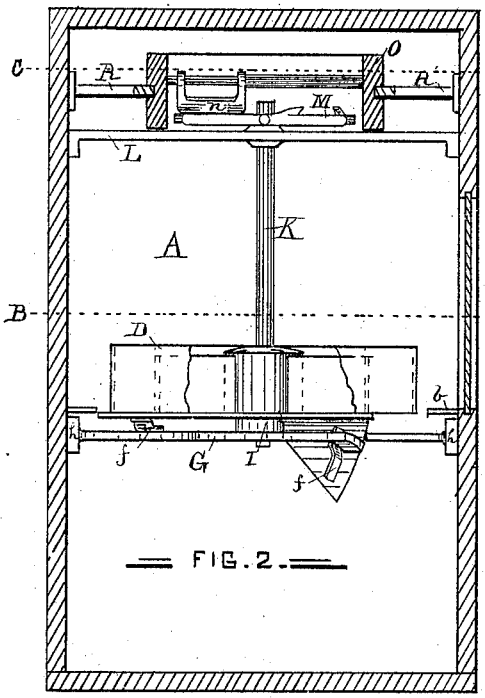
Figure 3:
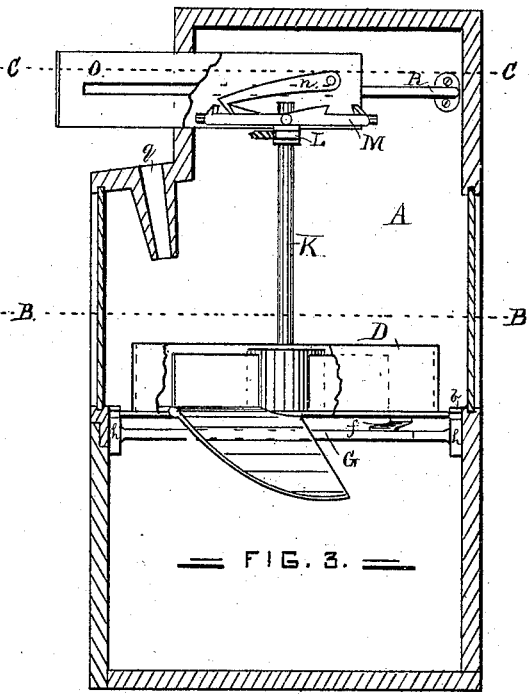
Figure 4:
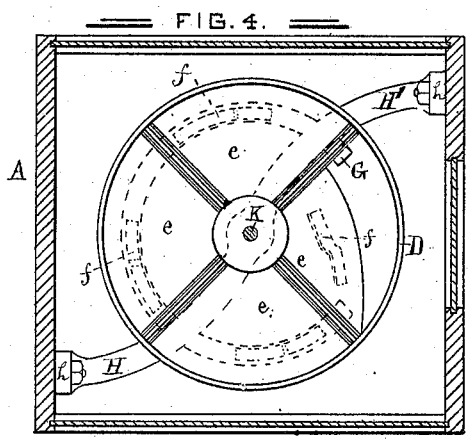
Figure 5:
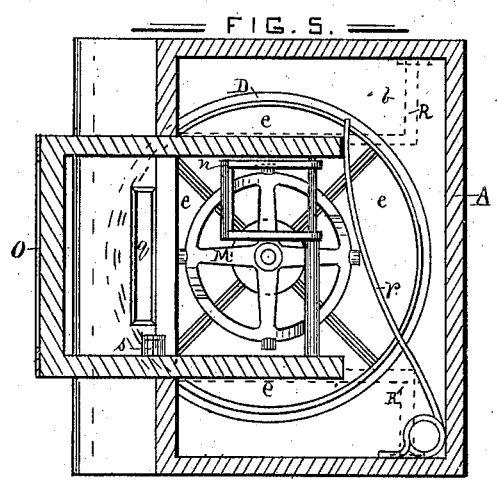

Figure 1, Sheet 1, represents a perspective view from that side of the box which faces inward. Fig. 2, Plate 2, is a vertical section through the line X X, and Fig. 3 a vertical section through the line Z Z; Fig. 4, a cross-section through line B B, and Fig. 5 a cross-section through line C C.

A is the box proper, which is divided at a suitable distance from its bottom with a horizontal division-plate, $b$, having an annular opening, in which is operated a temporary fare-receiver, D, the latter provided with a series of compartments, $e$, each furnished with a hinged bottom, that is held in a horizontal position by a spring, $f$, which is secured to the under side thereof, so that its free end may rest upon a segmental track, G, that is held in proper position by the projecting braces H H', the latter secured to the box by means of bolts, as at $h$. The braces H and H' are carried to the center of the track, at which point they form a step, I, for the reception of the lower end of a vertical shaft, K, and to which the aforesaid receiver is keyed or otherwise rigidly secured. The shaft K is held in a vertical position by a brace, L, the ends of which are bolted or otherwise secured to the sides of the box. That end of the shaft which passes upward through this brace is provided with a wheel, M, the rim of which is constructed with pins upon its outer edge and ratchet-teeth upon its upper surface. Over the latter is operated a drop or pawl, $n$, which is pivoted to the rear end of the push-block O, the latter when not in operation held in an outward position through the action of a spring, $p$, so that it may keep the opening $q$ entirely covered until it is desired to introduce a fare therein. The push-block is provided with grooved sides, in order that it may slide back and forth on guide-rods R R'. The ends of the latter are secured to the interior of the box in any convenient manner.

If found desirable, each compartment in the temporary receiver may be numbered, so that it can be identified after it has changed its position, and a gong be secured beneath the temporary receiver, the same to be sounded by the hinged bottom of each compartment as it automatically discharges its contents.

This invention relieves the driver of a duty heretofore entailed upon him—viz., that of pulling a strap or other contrivance in order to drop the fare from a temporary into a permanent receiver.

The outer rim of the receiver D should be made of wire, perforated, or transparent material, and it may be carried up to the full height of the box if so desired.

From the above it will be readily understood that the act of moving the push-block O inward to deposit the fare will cause the pawl $n$, which has previously engaged one of the ratchet-teeth of the wheel M to draw the same forward, and thus another compartment of the receiver is brought under the delivery-tube in time to receive the fare introduced therein. The inward movement of the push-block is limited by a rubber or other stop, $s$, which is so affixed to the inner side of the aforesaid push-block as to be brought in contact with one of the side pins of the wheel M the moment a subsequent compartment has been brought into position. On removing the hand from the push-block the spring $p$ will press the same outward, and cause the pawl $n$ to follow its movement and engage another ratchet-tooth. This operation repeated will finally carry the fares to the end of the segment G, when for want of support the bottom of the compartment opens outwardly, thus discharging its contents into the lower receptacle. A further rotation of the wheel will bring the hanging bottom to the opposite end of the segment, and upon which it is drawn until it finally assumes again a horizontal position.

Having described my invention, what I claim as new, and desire to secure by Letters Patent, is—

The combination of projecting slide O, operating horizontally, with pawl $n$, pivoted thereto, horizontal ratchet-wheel M, replacing-spring $p$, shaft K, carrying said ratchet-wheel, and horizontal partitioned dumping fare-receiver D, said parts being arranged in connection with casing A so as to constitute in themselves a complete fare-box adapted to display separately each fare, substantially as set forth.

In testimony whereof I have hereto signed my name.

WM. ZAEHRINGER.

In presence of—
 ALFRED W. J. MASON,
 HUGH PIERSON.